WILLIAM G. FASTIE
WILLIAM M. SINTON
INVENTORS

BY Walter G. Finch
ATTORNEY

Jan. 26, 1960 W. G. FASTIE ET AL 2,922,331

SPECTROSCOPIC DEVICE

Filed March 24, 1953 6 Sheets-Sheet 2

WILLIAM G. FASTIE
WILLIAM M. SINTON
INVENTORS

BY Walter G. Finch
ATTORNEY

SPECTROSCOPIC DEVICE

Filed March 24, 1953

WILLIAM G. FASTIE
WILLIAM M. SINTON INVENTORS

BY Walter G. Finch
ATTORNEY

WILLIAM G. FASTIE
WILLIAM M. SINTON INVENTORS.

BY Walter G. Finch
ATTORNEY

Jan. 26, 1960 W. G. FASTIE ET AL 2,922,331

SPECTROSCOPIC DEVICE

Filed March 24, 1953 6 Sheets-Sheet 5

WM. G. FASTIE
WM. M. SINTON
INVENTORS

BY Walter G. Finch
ATTORNEY

Jan. 26, 1960 W. G. FASTIE ET AL 2,922,331

SPECTROSCOPIC DEVICE

Filed March 24, 1953 6 Sheets-Sheet 6

WM. G. FASTIE
WM. M. SINTON
INVENTORS

BY Walter G. Finch
ATTORNEY

United States Patent Office 2,922,331

Patented Jan. 26, 1960

2,922,331

SPECTROSCOPIC DEVICE

William G. Fastie, Owings Mills, and William M. Sinton, Baltimore, Md., assignors of seventeen and one-half percent to Walter G. Finch, Baltimore County, Md.

Application March 24, 1953, Serial No. 344,348

18 Claims. (Cl. 88—14)

This invention relates generally to spectroscopy, and more particularly to an improved optical system which can be used in any type of spectrograph to produce a more useful spectrum from the standpoint of spectral resolution and freedom from coincident or overlapping spectra.

It is well known by those skilled in the art of spectroscopy that spectral dispersing elements, such as prisms, gratings, and the like, are limited in their spectral resolving power because of their limited size. In many applications, it is desired that the spectral resolving power be as large as possible so that small differences in the wavelength of radiation from a luminous body can be observed or measured. Resolving power can be defined as the ratio of the wavelength of the radiation, mathematically represented by the symbol $\lambda$, being observed or measured to the smallest wavelength difference, represented by the symbol $\Delta\lambda$, which can be just observed or detected. This ratio is represented by the symbol R. Therefore, $$R=\lambda/\Delta\lambda \qquad \text{Eq. 1}$$

For example, if a spectrograph is capable of distinguishing a wavelength difference of one-tenth angstrom unit (one-tenth angstrom unit has the dimension of one billionth of a centimeter; the angstrom unit of wavelength will hereinafter be denoted by the abbreviation A.U. or simply A.) when the radiation of the observed wavelength is 5,000 A.U., the resolving power R of the spectrograph is numerically equal to fifty thousand, in accordance with the above equation.

It is also well known by spectroscopists that greater resolving power can be obtained with a given dispersing element if the optical elements of the spectrograph are so arranged that the radiation is dispersed more than once by the prism, grating or the like, that is, the radiation to be spectrally analyzed is passed through a prism or transmission type diffraction grating more than once. Most of the conventional arrangements allowing multiple use of the dispersing element produce multiple spectra which are coincident with or overlap each other, and means must be provided to distinguish between or separate the various overlapping spectra.

It is a feature of this invention that the multiple spectra which are formed when multiple diffractions are used are not coincident with and do not overlap each other with the result that means do not have to be provided to distinguish between or separate the various multiple spectra.

It is also well known by spectroscopists that a diffraction grating produces multiple spectra when the radiation is dispersed by it only once, that is, each narrow wavelength region of the spectrum is formed into several spectra which are called the first, second, third, and so forth, orders. The angular relationship between the various spectral orders of a grating is expressed by the well known grating equation:

$$m\lambda=W/n\cdot(\sin\alpha\pm\sin\beta) \qquad \text{Eq. 2}$$

where the symbol $m$ represents the order number, $\lambda$ is the wavelength of the radiation, W is the width of the grating, $n$ is the number of lines ruled on the grating, $\alpha$ is the angle between the radiation incident on the center of the grating and a line which is perpendicular to the face of the grating at its center. This perpendicular line is called the grating normal. The symbol $\beta$ represents the angle between the diffracted or dispersed rays and the grating normal, and the negative sign is employed if $\alpha$ and $\beta$ are on the opposite sides of the normal.

It can be seen that if the radiation is incident on the grating at a fixed angle $\alpha$, there are a multiplicity of values of $\beta$ which may satisfy Equation 2. For example, if values of $W=10$ cms., $n=10^4$ lines, $\alpha=0°$, and $\lambda=1\times10^{-4}$ cms., are substituted into Equation 2, and $m$ is assigned values between 1 (one) and 10 (ten), then $\beta$ will have 20 (twenty) value between $-90°$ and $+90°$ which will satisfy Equation 2. It is this multiplicity of spectra which are obtained whenever a grating is used as a spectral dispersing element. It can be seen from Equation 2 that the highest order spectrum can be obtained when both the angles $\alpha$ and $\beta$ are nearly 90°, their sines therefore being nearly equal to unity.

It can also be observed from Equation 2 that for given values of $\alpha$ and $\beta$, and for a given grating of width W ruled with $n$ lines, there are a multiplicity of values of $\lambda$ and $m$ which will satisfy the equation, that is, more than one wavelength of radiation will be present in the spectrum of a grating spectrometer. In particular, in the spectrum of the third order of a wavelength of 6,000 A.U., there will also be present the first order of radiation of wavelength 18,000 A.U., the second order of radiation of wavelength of 9,000 A.U., the fourth order of wavelength 4,500 A.U., the fifth order of wavelength of 3,600 A.U., the sixth order of wavelength of 3,000 A.U., and so forth, as can be calculated from Equation 2. In the spectrum of the first order of 6,000 A.U., the only additional wavelengths listed above which appear are the second order of 3,000 A.U. Thus, to avoid excessive overlapping of spectra when a grating is employed as a spectral dispersing means, it is necessary to use the grating in a low numbered order, preferably the first order.

However, as is well known by spectroscopists, the resolving power of a grating is numerically equal to the product of the order number $m$ and the number of lines $n$, i.e. Equation 1 can be written for a grating as follows:

$$R=\lambda/\Delta\lambda=n\cdot m \qquad \text{Eq. 3}$$

The maximum value of R, denoted by $R_{max}$, which can be obtained with a grating is determined by combining Equations 2 and 3, when $m$ is at its maximum value, that is, when $\alpha$ and $\beta$ equal 90°. Thus $$R_{max}=2W/\lambda \qquad \text{Eq. 4}$$

Therefore, it can be seen, as stated previously, that the maximum resolving power which can be obtained with a grating is limited by the width of the grating. It can also be understood from the foregoing that the high resolving power which is available in the highest orders of a grating can only be obtained with the sacrifice of freedom from overlapping spectra. It is, therefore, one of the principal objects of this invention to eliminate this disadvantage by providing an improved optical system which can be used in any type of spectrograph and which will produce a spectrum of high spectral resolution and one which is free of coincident or overlapping spectra.

It is a feature of this invention that a grating can be used in a low order with multiple diffractions which produce a number of spectra which do not overlap, and in which even higher resolving power can be realized than is obtained when a single diffraction is employed and when a high order is used. The improvement in resolving power which can be obtained by these multiple diffraction techniques can be better understood by reference to the grating relationship:

$$R=n\cdot m\cdot r \qquad \text{Eq. 5}$$

where, as before, R represents the resolving power, $n$ the number of lines on the grating, $m$ the order of the spectrum, and the new symbol $r$ is the number of times the radiation is diffracted by the grating. High numbered spectra as hereinafter defined refer to those spectra which are obtained by returning the radiation from the focused spectrum of the dispersing element to the dispersing element to be dispersed again. This procedure of returning the radiation from the focused spectrum can be repeated any number of times as described above. In all systems that are hereinafter described, focused spectra have been utilized. It has been explained before that the product $nm$ is limited to a maximum value which is dictated by the width of the grating. However, the value $r$ can be made arbitrarily large merely by using a large number of reflections from the grating so that the maximum resolving power which can be obtained can be very large even if the value of $m$ is only unity. Spectra which are obtained when $r$ is greater than one are hereinafter referred to as high numbered spectra.

It should be observed that each time the radiation is diffracted by the grating, there is a loss of radiant energy by absorption or by diffraction into other orders than the one which is desired. Since the amount of radiant energy emitted by any source is limited, it is not possible to employ an unlimited number of diffractions from the grating, and, therefore, the values of $r$ are limited in any practical application. However, as will be shown subsequently, enough diffractions can be employed with a grating to make the multiple diffraction technique of practical importance.

It is well known that the use of multiple diffractions with a grating or multiple transmissions through prisms in addition to affording increased resolution, also produces a spectrum in which the various wavelengths can be separated from each other by a greater amount than if only one diffraction or transmission were employed, that is, the spectral dispersion can be greater. For example, in a system employing three uses of the dispersing element, spectral lines of a given wavelength spacing will be separated by three times the distance in the focal plane than the spacing obtained if only one use of the dispersing element were made in the particular spectrograph. Because the various wavelengths or colors are spread out, a wider slit can be employed without producing any more running together of the various colors than if only one diffraction or transmission were employed and a narrower slit were used. The larger slit or slits afford more radiant energy than the smaller ones, and the spectra obtained after multiple use of the diffraction element would be brighter than the spectra obtained with only one use of the spectral dispersing element, provided the absorption and other losses are not excessive.

For example, if a grating has an efficiency of 75 percent, that is, if it sends 75 percent of the radiant energy in a small wavelength interval $d\lambda$ into a given order of the grating, then, after two diffractions of the grating, the energy present in the spectrum in the wavelengths $d\lambda$ can be 1.5 times as large as would be present in the same wavelengths interval if only one diffraction wer employed. However, the resolving power in this case would not be improved by the use of multiple reflections, because it has been sacrificed in order to obtain the increased brightness of spectrum.

It is an object of this invention to employ multiple diffraction from a grating to produce brighter spectra which do not coincide with or overlap other spectra. It is to be pointed out that an intermediate arrangement may be employed in which multiple diffractions are employed to produce a fractional improvement in resolution and a fractional increase in brightness of the spectra.

If straight slits are used in any of the spectrographs described herein, the line along which the straight slits lie is usually substantially parallel to the axis of rotation of the prism, or, if a grating is employed, the slits may be parallel to the lines of the grating, the lines of the grating having been made parallel to the axis of rotation. It is also to be noted that when a slit is referred to herein, it means a slot cut in a plane piece of material, such as sheet metal. A curved slit is defined as a slot cut in a plane piece of material, such as sheet metal, and having the center of curvature of each infinitesimal segment of the slot contained within the plane sheet of material.

It is known that if a plane mirror or mirrors are placed anywhere in the focal curves of a prism Littrow type spectrograph, Ebert spectrograph, Wadsworth grating type spectrograph, Paschen type spectrograph, and the like, so that some, or all, of the radiation is reflected and again falls on the dispersing elements, the radiation will be focused into a second image again in the immediate vicinity of the entrance slit directly above, below or coincident with it, but this type of double use of the dispersing element does not produce doubled spectral resolution or doubled dispersion. In fact, there will be no dispersion or spectral resolution at all, the double use being of such a nature that the spectral dispersion present in the first spectrum image is exactly canceled and all wavelengths are coincident in the second image. If, however, two plane mirrors are employed, with their reflecting surfaces perpendicular to each other, and positioned so that their line of intersection is in the focal plane of any of the above described spectrographs and is parallel to the lines on the grating or to the axis of rotation of the dispersing prism, the radiation intercepted by such a pair of mirrors will be returned to the dispersing element and a second spectrum will be formed in the focal plane of the first lens or mirror. In this case, the spectral resolution of the spectrograph can be twice as large as that normally obtained if the double mirrors were not utilized.

The difference between the results obtained when a single and a double mirror is used can be explained by applying Equation 2 to a double passage through the system. When a single mirror is used, radiation of any wavelength $\lambda$ is returned to the grating at the same angle at which it was diffracted, that is, the angle of diffraction $\beta$ for the first passage is identical to the angle of incidence $\alpha'$ for the second passage. The angle of diffraction $\beta'$ for the second passage must then, in order to satisfy Equation 2, be identical to the angle of incidence $\alpha$ of the first passage, and the radiation of all wavelengths must be returned in the direction of the entrance slit.

If, however, the radiation in the first spectrum is laterally displaced, as by a double perpendicular mirror and returned for the second passage, the angle of incidence $\alpha'$ of the second passage is not identical to the angle of diffraction $\beta$ for the first passage, thus making it necessary that the angle of diffraction $\beta'$ for the second passage be different from the angle of incidence $\alpha$ of the first passage in order that Equation 2 be satisfied.

Consider the case when $\alpha$ and $\beta$ are on the same side of the grating normal and the displacement is such that $\alpha'$ is greater than $\beta$, then $\beta'$ must be smaller than $\alpha$ in order to satisfy Equation 2. For a slightly different wavelength of radiant energy, the lateral displacement may be reversed. That is, another wavelength of radiant energy will be displaced in the opposite direction by the double mirrors—thereby making the angle of incidence $\alpha'$ for the second passage of the radiant energy less than the angle of diffraction $\beta$ for the first passage thereof, and thus requiring that the angle of diffraction $\beta'$ for the second passage of the radiant energy be greater than the angle of incidence $\alpha$ for the first passage thereof. The particular wavelength of radiant energy which goes to the line of intersection of the double second mirrors is returned to the grating without lateral displacement and after the second passage thereof returns to the entrance slit.

It is seen from the consideration of these three wavelengths of radiant energy that the action of the double mirror is to invert the order of the spectrum as it is returned to the grating. This inversion is responsible for retaining an angular spread between the wavelengths of radiant energy after two diffractions. In fact, further analysis of Equation 2 will show that this angular spread is twice as great in the second spectrum as it was in the first spectrum. It is essential that the spectrum be inverted by some means each time the radiation is returned to the grating in order that multiple diffractions produce increased dispersion and spectral resolution. There are other means than a double mirror by which such inversion can be produced. For example, a concave mirror, which has its center of curvature in the focal curve of the mirror, receives spectral energy after it has been focused by mirror and returns the energy to a focus in the focal plane. This concave mirror, in addition to reversing the direction of the rays and sending them through the spectrometer again, also inverts the spectrum so that double dispersion and resolution are obtainable in the second spectrum. It is to be emphasized that any spectrum inversion means can be employed in conjunction with this invention, although subsequent discussion will be limited to double perpendicular mirrors for accomplishing the spectrum inversion.

If a second pair of perpendicular mirrors are placed in the second spectrum to send the radiation through the optical system a third time, a third spectrum will then be formed in the same plane in which the first spectrum is formed, and so on. After three complete passages through the optical system, the linear separation in the focal plane between two nearby wavelengths is three times as great as is present when only one passage through the system is employed. Furthermore, in contrast to the zero spectral resolution obtained if a single mirror is used, the spectral resolution observed when double mirrors are employed is $r$ times the resolution observed with a single passage through the system, where $r$ is the number of transmissions through the system, in accordance with Equation 5 above.

The pairs of mirrors which are required my be plane pieces of metallized glass, or they may be the internal perpendicular surfaces of an isosceles right angle prism, the other surface, the hypotenuse, being parallel to the focal plane in which the apex of the prism is placed. The perpendicular surfaces of the prism need not be metallized since the light passing through the hypotenuse strikes each right angle surface at an angle greater than the critical angle, and is, therefore, totally internally reflected according to well known principles before leaving the prism through the hypotenuse. Past and future reference herein to double mirrors always applies to either a pair of metallic surfaces or metallized glass surfaces or to a totally reflecting right angle isosceles prism.

The use of double mirrors or other spectrum inverting means to produce additional spectra introduces the difficulty that the additional spectra overlap the original spectrum which leads to a similar confusion as when a grating is used in a high order. It is well known by spectroscopists that this difficulty can be practically overcome, for some applications, by the use of a light chopper system which allows a frequency sensitive detecting system to differentiate between the overlapping spectra. For example, in one commercially available spectrograph employing a single pair of right angle mirrors to produce a second spectrum overlapping a region of the first spectrum, a steady, unmodulated light source is employed to produce the first spectrum. This spectrum, therefore, produces a direct current voltage on the detector which is associated with the exit slit. A light chopper consisting of a rotating sector blade is employed to modulate only the light which passes through the double mirror system. When this modulated radiation passes through the optical system and impinges on the detector, a modulated or alternating voltage is produced in the detector circuit. The electronic equipment which is used to produce a pen and ink recorder record of the radiant energy signal is not sensitive to the direct voltage signal but is sensitive to the modulated or alternating voltage which is produced by the radiation which passes through the system twice.

There are several limitations to the above described harmonic differentiation method. It is not applicable to the photographic detecting method or to other detectors which cannot differentiate between unmodulated and modulated radiation. If, as is usually the case, the source emits radiation which is not unmodulated but which contains an alternating component consisting of all frequencies (this alternating component originating from random emission of the elementary light particles or from random temperature or emissivity variations in the source), the second spectrum cannot be completely harmonically analyzed without loss of signal to noise ratio. That is, for example, if the first spectrum has an intensity of 1,000 energy units which can be determined to a random limit of ten (10) energy units, and the second spectrum has an intensity of 100 energy units and can be determined to a random limit of one (1) energy unit, the harmonic analysis system cannot measure the intensity of the second spectrum to a limit of less than ten (10) energy units, or to only one-tenth the limit of accuracy which could be obtained if the spectra did not overlap.

It is an object of this invention to provide an improved spectrograph so that the first and higher numbered spectra are optically separated and do not overlap or interfere with each other with the result that harmonic analysis is not required, and the intensity of the last spectrum can be determined to the accuracy or signal to noise ratio imposed by only the random limit of that last spectrum.

In one embodiment, this invention consists of the use of an additional pair of double mirrors positioned parallel to each other and with their reflecting surfaces facing each other. Both surfaces are at an angle of 45° to the focal plane of the spectrograph. One of these mirrors is of such dimension and is so positioned that it intercepts all of the radiation leaving one of the pair of double mirrors which are employed to return the radiation through the dispersing element. This radiation is reflected by one of the pair of mutually parallel mirrors and sent to the other mirror of the pair which reflects it so that it finally continues in the same general direction in which it was traveling, except that it is displaced somewhat.

For example, if a spectrograph is arranged in the normal horizontal manner, with the slits in a vertical direction, and the light traveling in a horizontal direction, which arrangement will be assumed in all subsequent discussion, the one or more pairs of mirrors with their line of intersection parallel to the slits act to displace the radiation in a horizontal manner, and to reverse its direction, whereas the newly described pair of mirrors with their surfaces parallel act to displace the radiation in a vertical direction without reversing its direction. When the beam of radiation thus displaced is passed through the dispersing system again and brought to a final focus, the spectrum which is formed will be displaced above or below the first spectrum and, therefore, will not be overlapped or interfered with by the first spectrum.

It was explained earlier that the pair of perpendicular mirrors can be two separate reflectors or can be the total internally reflecting faces of a right angle isosceles prism. Similarly, the pair of parallel mirrors can be totally reflecting faces or a rhombohedron (hereinafter referred to as a rhomb), four of whose faces are rectangular and the remaining two faces having angles of 45° and 135°, and positioned so that the radiation passes perpendicularly through a rectangular face is totally internally reflected from another rectangular face which makes an angle of 45° with the beam of radiation. The radiation then passes to the opposite face which is parallel to the previously reflecting face. This face totally internally reflects the radiation so that it passes in its initial direction perpendicularly through the rectangular face which is parallel to the face through which the radiation entered.

It can be seen that such a rhomb can be constructed by placing one of the short sides of a right angle isosceles prism in contact with and completely overlapping one of the short sides of an identical right angle isosceles prism, the prisms being oriented so that their hypotenuses are mutually parallel. It can also be seen that the rhomb can be placed in optical contact with the right angle isosceles prism with which it is associated so that a single assembly providing the two mutually perpendicular displacements would result.

Such an assembly or an equivalent assembly consisting of four mirrors could be placed in the spectrum of any of the previously mentioned spectrographs to send part or all of the radiation back through the optical system again to form a second spectrum near the entrance slit, but displaced to one side of the entrance slit and additionally displaced above or below the entrance slit. The exit slit can be placed in this second spectrum, or a photographic plate or visual means of observation can be employed. If an electrical detector is used to measure the radiation intensity, a light chopper need not be employed. If it is desirable, for any reason, to employ a light chopper, it may be placed in any part of the optical path.

One of the advantages of employing a light chopper at the right angle mirrors to produce a modulated signal in the second spectrum is the reduction in scattered light which results from the high energy undispersed radiation from the entrance slit being nonspecularly reflected from the optical elements. Since this radiation is unmodulated, it is not detected when a frequency sensitive detecting system is employed. A light chopper can be associated with the quadruple mirror system so that the unmodulated scattered light can be ignored, and all of the advantages of the harmonic analysis system can be obtained with none of its disadvantages.

It is a property of many reflection diffraction gratings that they scatter radiation in a special way, namely the scattered light remains in the spectrum. For example, at a particular point in the spectrum where the wavelength $\lambda$ should appear, all other wavelengths present in the spectrum will also appear in small amounts. However, above or below the spectrum, no radiation will appear. In contrast, prism or transmission gratings scatter all wavelengths in all directions so that scattered light appears above and below and within the spectrum of a prism spectrograph. The double displacing system which is the substance of one embodiment of this invention, can, therefore, provide, in many cases, diffraction grating spectra in which scattered light is minimized without the need to use a harmonic analysis system, or other well known optical means for avoiding scattered light.

It is only necessary to employ one quadruple mirror, no matter how many uses of the dispersing element are desired, that is, pairs of double mirrors may be employed to send the radiation through the system any number of times, but before the final passage the quadruple mirror can be used to provide the desired displacement of the final spectrum from the other spectrum or spectra. Alternatively, the quadruple mirror may be first in the series or may be used in any combination with several pairs of mirrors.

In most of the above discussion, the slits have been considered to have straight edges and narrow spectral lines have been assumed to be straight. However, as is well known by spectroscopists, both prism and grating spectrometers employing straight entrance slits produce spectra in which the spectral lines are curved, or stated more generally, the locus of monochromatic light is not a straight line. In most spectrometers employing photographic detectors, the curvature of the spectral lines does not cause any loss of spectral resolution. However, in monochromators and other forms of spectral dispersing instruments employing an exit slit, a straight exit slit does not pass monochromatic light, that is, the light leaving the exit slit contains a wider range of wavelengths than the instrument is capable of resolving. The magnitude of this error increases with the length of the slits and also depends on the nature of the dispersing element (whether it is a prism or a grating). The error also varies with the wavelength of the radiation, and depends on the number of times the radiation is dispersed by the prism or grating. It is common practice to curve either the entrance or the exit slit to correct for the error described, but such curvature is only perfectly correcting for one wavelength and for a specified number of uses of the dispersing element.

It has been shown by one of the co-inventors in an article entitled "Image Forming Properties of the Ebert Monochromator," published in the Journal of the Optical Society of America, vol. 42, No. 9, pp. 647–651, dated September 1952, that, for a plane grating monochromator, the entrance and exit slits can both be curved in such a way that there is no wavelength error along the exit slit, and that this curvature of the slits is the correct one for all wavelength. That is, in any plane grating spectrometer there will be two geometric circles of specified radius, one of which is coincident with an edge of the entrance slit and one of which is coincident with an edge of the exit slit and for any and all positions of the grating there will be no variation of wavelength along the circle which is coincident with an edge of the exit slit. It was further shown in the above referred to publication that the above described condition could be realized in the Ebert type plane grating optical system to be described subsequently where the center of curvature of the curved entrance slit and exit slit coincide. These slits are in the same plane and their centers fall on the geometric center line of the optical system and the plane containing the slits is perpendicular to the line.

In co-pending application Serial Number 241,194, now U.S. Patent No. 2,757,568 by William G. Fastie, one of the present inventors, a plane grating monochromator of the Ebert type was described. The geometrical arrangement which was described is identical to the Ebert system in the present invention. As explained in the copending application, if the slits are curved as described above, the effect of astigmatism, the only significant optical aberration of the Ebert system, is eliminated. The fact that the geometrical arrangement of the curved slits as described in the above referred to copending application also corrects for wavelength error is a fortunate coincidence which results in a spectrometer which produces perfect optical images with no spectral error throughout the entire spectrum.

It can also be shown that, when multiple diffractions are employed in the Ebert type of spectrograph, the condition of no wavelength error along the exit slit can be exactly satisfied if both the entrance and exit slits are on the same circle and if the intermediate spectra are also on the same circle, that is, if the double mirrors are placed in the Ebert monochromator so that the virtual image of the first to the $(r-1)$th spectrum all lie on the same circle as the entrance and/or exit slits. There will subsequently be described several arrangements of double mirrors by which this can be exactly accomplished or substantially accomplished and by some of which displacement of the final spectrum is accomplished to avoid overlapping of the final spectrum with other spectra. These arrangements which are described hereinafter also maintain the freedom from aberration described in the above referred to copending patent application.

In addition to the Ebert type spectrograph, there are other plane grating monochromator mirror and lens systems as previously described herein in which the entrance and exit slits can both be made circular, although not necessarily of the same curvature and in which double mirrors can be positioned to produce an *r*th spectrum which is displaced from all other spectra and which does not exhibit wavelength error along the exit slit for any wavelength leaving the exit slit, that is, for any position of the grating. The exit slits are not necessarily in the same plane in some of the spectrometers. If the slits of any of the above described plane grating monochromators, including the Ebert monochromator are very short, the wavelength error along the slit can be negligibly small if only one diffraction is employed, but when multiple diffractions are employed the wavelength error may become significant. In any of the below described systems of double mirrors in an Ebert monochromator, this wavelength error will not be magnified when straight slits are used and when multiple diffractions are employed. Thus the multiple diffraction arrangements described for the Ebert system and the similar arrangements for the other plane grating system can be advantageously employed with short straight slits.

In its essence, therefore, one of the objects of the invention is to provide a spectrograph in which multiple use of the dispersing element is accomplished by use of double mirrors and in which a quadruple mirror is used to provide displacement of the final spectrum in order to avoid overlapping of the final spectrum with other spectra.

Another object of the invention is to provide a spectrograph in which multiple use of the dispersing element is employed to produce second or higher numbered spectra which do not overlap and which, therefore, do not require a harmonic differentiation detecting system.

Still another object of the invention is to provide a reflection type grating spectrograph in which multiple use of the dispersing element is employed with a pair of displacing mirrors to provide non-overlapping spectra in which scattered light is minimized.

Even another object of this invention is to provide a spectrograph in which multiple use of the dispersing element is employed to produce higher numbered spectra which do not overlap and which can be analyzed and studied through the use of multiple detectors.

And another object of the invention is to provide a spectrograph arrangement to produce a more useful spectrum from the standpoint of spectral resolution without producing overlapping spectra.

To provide spectrographic arrangements of the Ebert monochromator type which employ either short or long slits and in which multiple use is made of the dispersing element but which eliminates or minimizes variations of curvature of spectral lines with wavelength, is still another object of this invention.

A more general object of the invention is to provide spectrographic arrangements of the plane grating monochromator type which employ either short or long slits and in which multiple use is made of the dispersing element but which eliminates or minimizes variations of curvature of spectral lines with wavelength.

Other objects and many of the attendant advantages of this invention will be greatly appreciated as the same becomes better understood by reference to the following detailed description when considered in connection with the accompanying drawings, and in which.

Figure 1:
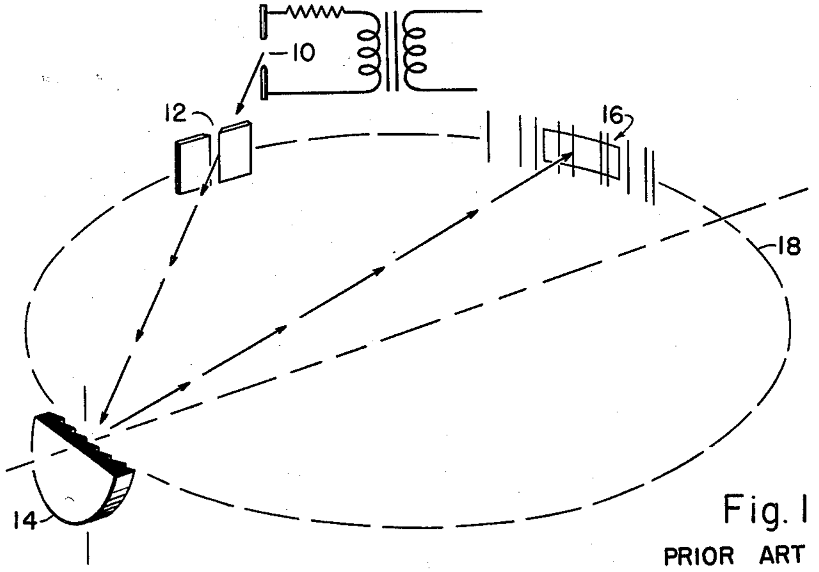
Fig. 1 PRIOR ART
Fig. 1 is a perspective view of a prior art Paschen concave reflecting grating spectrograph illustrating the formation of a spectrum on the Rowland circle.
Figure 2:
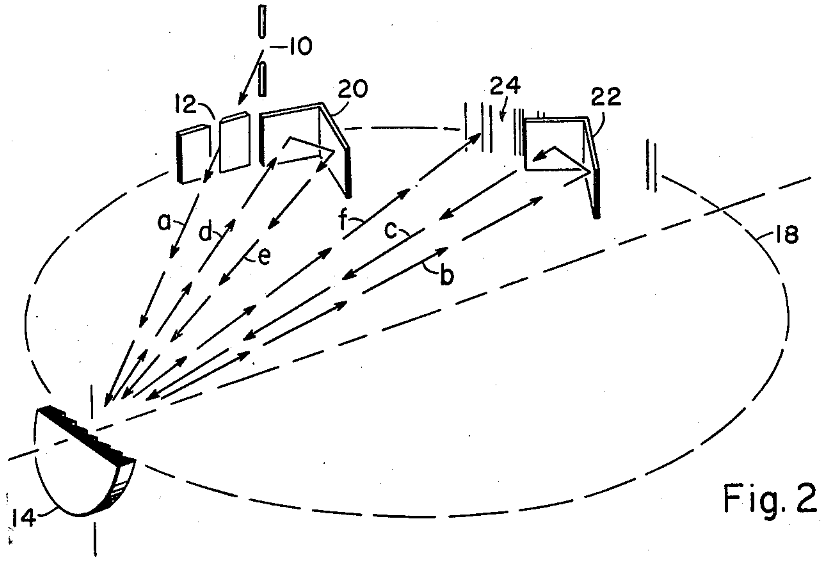
Fig. 2 is a view similar to Fig. 1 illustrating a reflecting grating spectrograph utilizing two pairs of perpendicular mirrors to produce a third spectrum overlapping the first spectrum on the Rowland circle.
Figure 3:
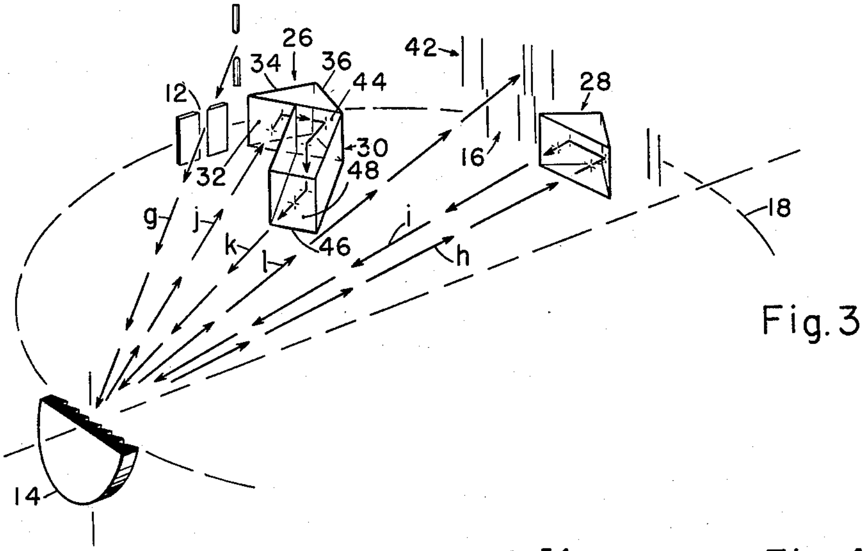
Fig. 3 shows a perspective view of one preferred embodiment of the invention applied to the arrangements of Figs. 1 and 2 in which use is made of a prism in the first spectrum and a prism-rhomb combination in the second spectrum and in which multiple reflections of the spectral lines are achieved and overlapping spectra are eliminated.
Figure 6:
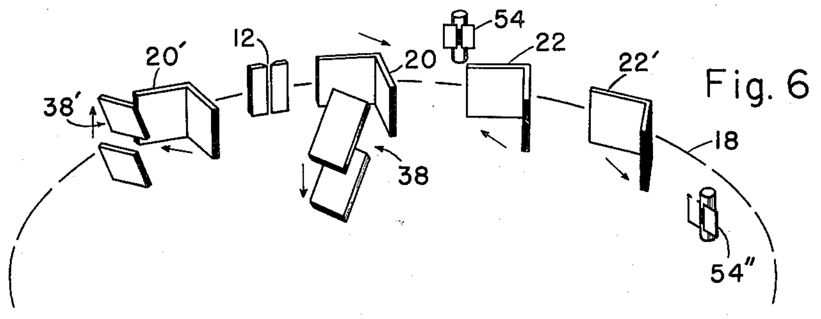
Figure 7:
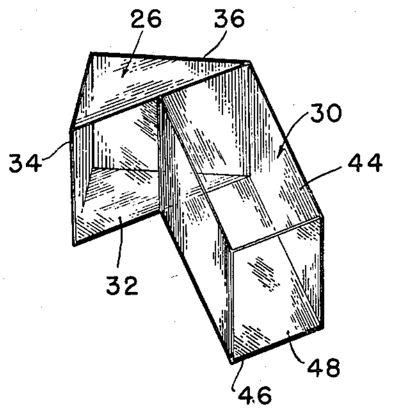
Figure 8:
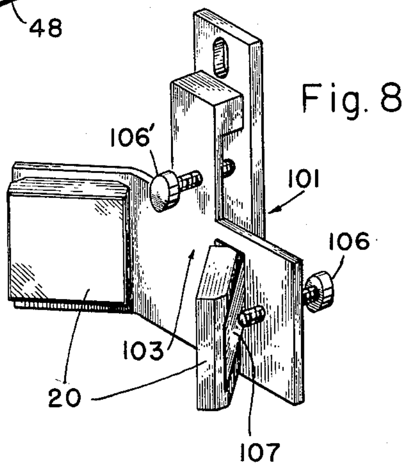
Figure 9:
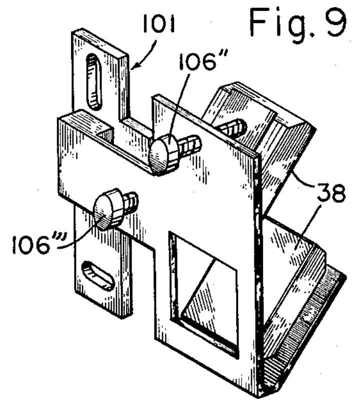
Figure 10:
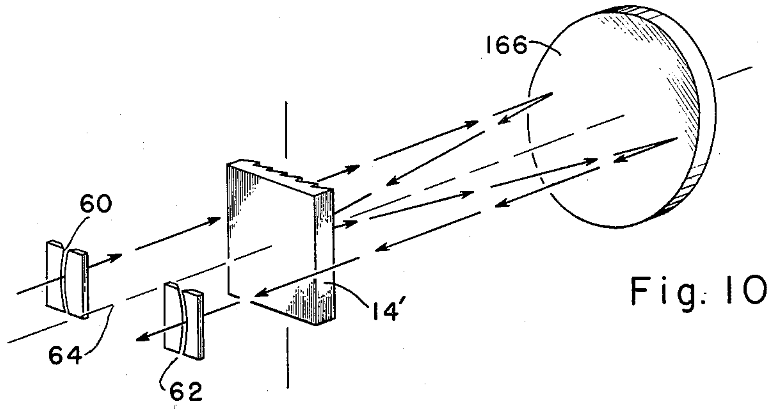
Figure 11:
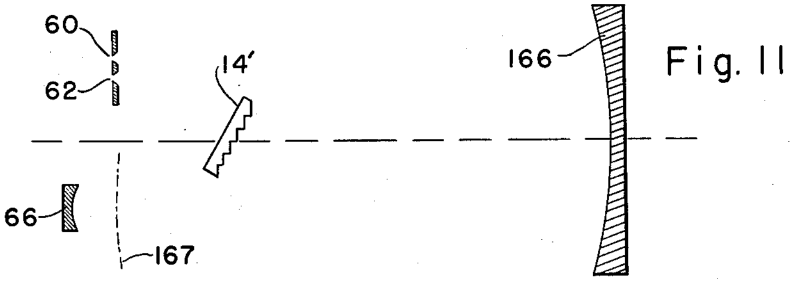
Figure 12:
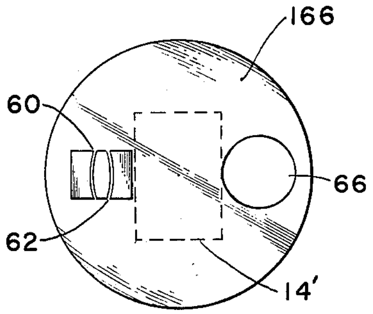
Figures 13, 14, 15:
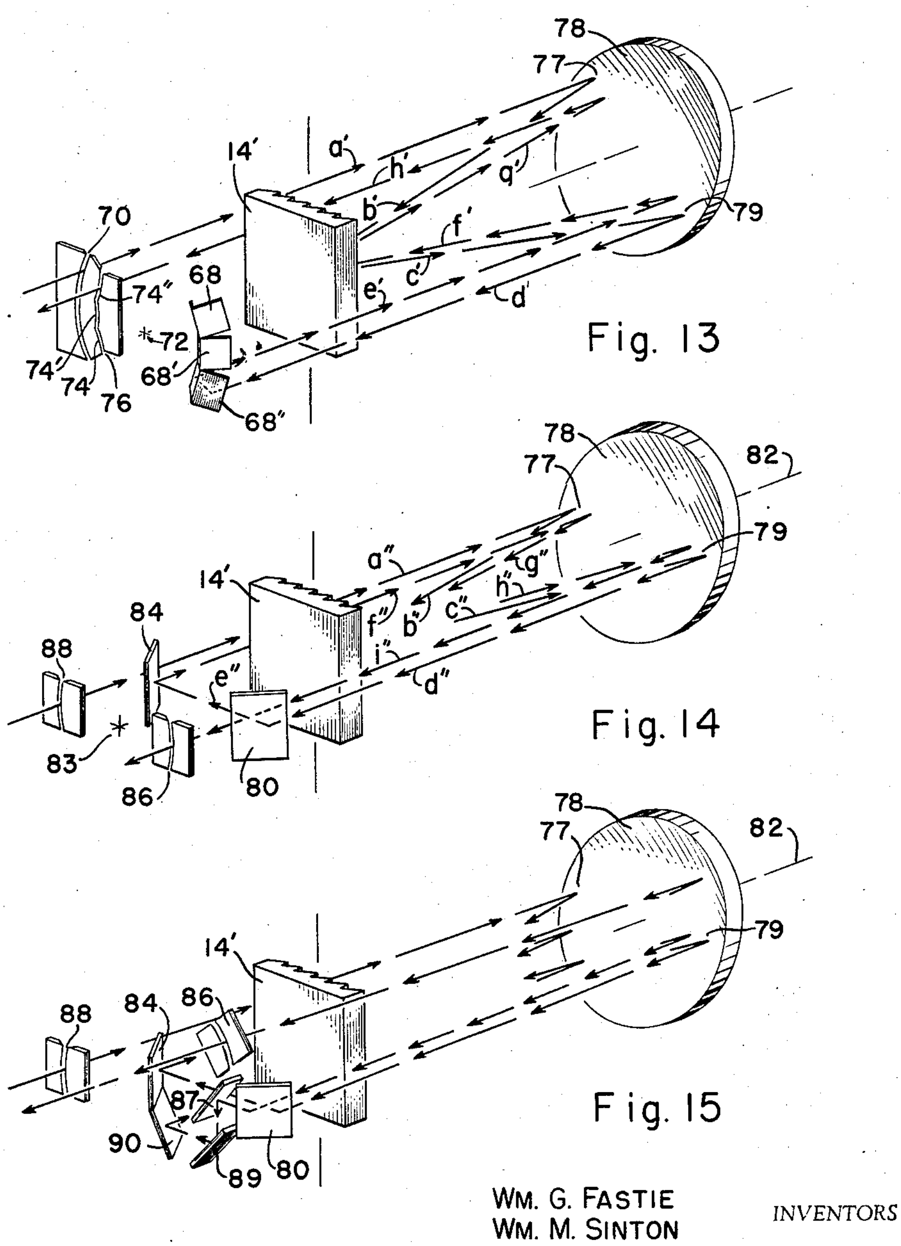
Figure 16:
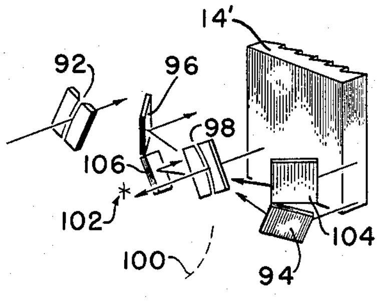
Figure 16:
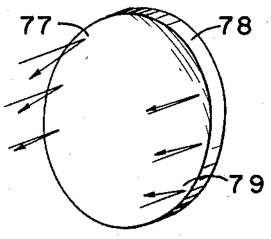
Figure 17:
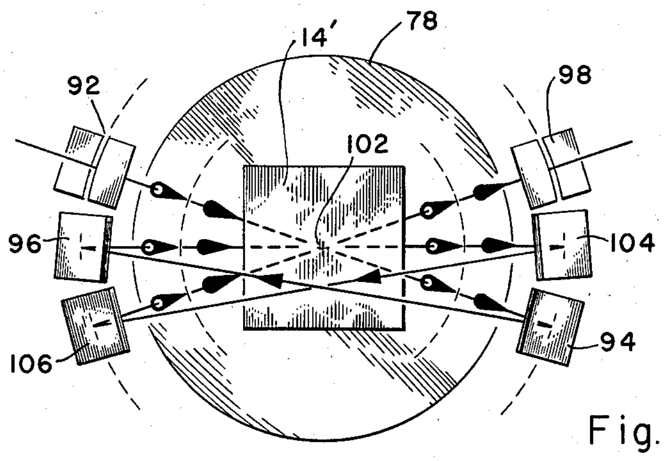

Figs. *5a*, *5b* and *5c* illustrate spectra obtained by using the optical arrangements of Figs. 1, 2 and 3;

Fig. 6 is a perspective view of still another embodiment of the invention in which two four mirror combinations are utilized and a multiple number of perpendicular mirrors are mounted in the first spectrum;

Fig. 7 is an enlarged view of a prism-rhomb combination used in the embodiments of the invention above;

Fig. 8 is a perspective view of a pair of perpendicular mirrors showing the mounting and adjustment thereof;

Fig. 9 is a perspective view of parallel mirrors showing the mounting and adjustment arrangement therefor;

Fig. 10 is a perspective view of an Ebert type plane grating spectrometer utilizing curved entrance and exit slits and in which no variation of wavelength due to curvature of spectral lines occurs;

Fig. 11 is a schematic of an Ebert plane grating spectrograph utilizing a concave mirror in the first spectrum to reverse the image of the spectrum and in which the exit slit is located adjacent the entrance slit;

Fig. 12 is an end view of the arrangement shown in Fig. 11;

Fig. 13 illustrates a perspective view of an Ebert type monochromator system employing a multiplicity of small double mirrors to allow multiple use of the dispersing element when long slits are used in the system and by which variation of curvature of spectral lines with wavelength is minimized;

Fig. 14 illustrates a perspective view of an Ebert monochromator which employs two 45° mirrors to allow multiple use of a dispersing element, together with long curved slits to minimize variations of curvature of spectral lines with wavelength;

Fig. 15 is similar to Fig. 14 in which offset mirrors are used to displace the $(r-1)$th spectrum to eliminate overlapping and interfering spectra;

Fig. 16 illustrates still another perspective view of an optical arrangement similar to that illustrated in Figs. 13 and 14 for producing multiple spectra without overlapping thereof and without introducing errors due to curvature of spectral lines; and Fig. 17 is end view of the arrangement illustrated in Fig. 16, showing all of the ray lines.

Referring now to Fig. 1 of the drawings, there is illustrated a type of reflecting grating spectrograph known as the Paschen type spectrograph which was described in the foregoing and in which radiation from a suitable source 10 passes through an entrance slit 12 and is directed incident on a spherically concave grating 14 which forms an image of a spectrum in the focal curve of the grating. This curve 18, in which the image of the spectrum 16 is formed, is a complete circle having a diameter which is equal to the radius of curvature of the grating 14 and which focal curve contains the entrance slit 12 and the center point of the surface of the grating 14. Slit 12 may be placed at any point on the circle 18 with respect to the grating 14, or a photographic plate 16 may be placed, after being bent, along the circle. This grating 14 is positioned so that the tangents to centers of the grating lines, which are at the center of the grating, are perpendicular to the plane of the circle 18, and the arc through the centers of the grating lines is tangent to the circle, which conventionally is known as the Rowland circle. Some of the various embodiments of the present invention will be illustrated with this type of spectrograph, although it is to be understood that the features of the invention are not to be limited thereto but can be readily used, with other types of spectrographic arrangements.

In Fig. 2, there is illustrated a Paschen spectrograph, similar to that shown in Fig. 1, by which it is possible to obtain multiple spectra in which the spectral lines overlap. In this spectrographic arrangement, a concave reflecting diffraction grating 14 is used as illustrated in Fig. 1. This grating 14 has a 21′ 11″ radius of curvature, 5¼″ of ruling of 14,400 lines per inch, giving a total of about 75,000 lines, 2½″ in length. The entrance slit 12 together with the lines of intersection of pairs of perpendicular mirrors 20 and 22 are placed in the focal curve of the grating 14 on the Rowland circle, with the lines of intersection of the pairs of mirrors 20 and 22 being arranged parallel to the ruled lines on the grating 14 and the slit 12. The reflecting surfaces of the mirrors 20 and 22 are formed of metallized glass. The source of radiation 10 can be a mercury (Hg) arc, although it could readily be a heated incandescent solid, a gaseous discharge tube, a spark or arc produced by an electric charge passing between two electrodes as shown in Fig. 1, or any other source of light which is allowed to pass through the entrance slit 12.

Instead of using two pairs of perpendicular mirrors 20 and 22 to obtain overlapping spectra, such as 24, right angle isosceles prisms can be utilized. These prisms would be placed so that their apexes would be in the focal curve 18 of the grating 14, with their hypotenuses being parallel to the focal plane or curve 18 in which the apexes of the prism are placed. It is not necessary to metallize the perpendicular surfaces of the prism since the light that passes through the hypotenuses of the prisms strikes the right angle surfaces of each at an angle greater than the critical angle and is totally internally reflected before leaving either of the prisms. The rays from the source 10 are consecutively lettered *a, b, c, d, e,* and *f,* to indicate their path to the final image, which, as previously indicated, is formed in the focal curve 18.

Because of loss of energy at each deflection from a diffraction grating, such as 14, there is a practical upper limit to the number of reflections which can be used. It is possible to routinely produce 15,000 lines per inch gratings which have high energy efficiency in the second order. Gratings which are "blazed" in the sixth order are rare, and do not approach the energy efficiency obtainable in a second order blaze. Thus a well blazed second order grating will give a third spectrum which is brighter than the sixth order spectra. Furthermore, a well blazed grating is useful only in one order, whereas by use of multiple reflections several useful spectra are available.

When a mercury arc is used as source 10, the mercury spectrum has only a few lines, and no real difficulty is encountered in high orders or with conventional multiple diffraction due to overlapping spectra. However, the spectrum of iron contains many lines and overlapping spectra cause considerable confustion. As previously pointed out, it is a feature of this invention to eliminate this confusion of spectra.

Figure 4:
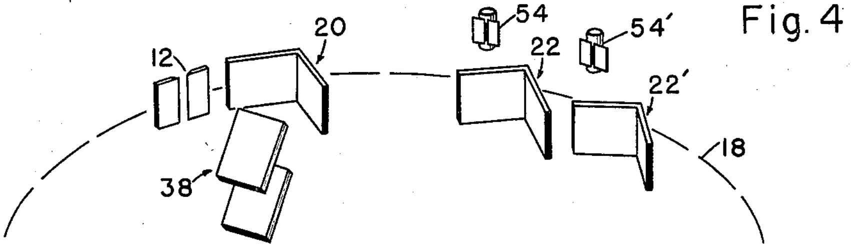
Fig. 4 is a perspective view of another embodiment of the invention, similar to Fig. 3, in which use is made of a second pair of perpendicular mirrors in the first spectrum.

In Fig. 3 there is illustrated how the arrangement of Fig. 2 can be altered by means of one embodiment of this invention to use multiple reflections of the spectral lines to avoid overlapping. The entrance slit 12 with the slot provided therein and right angle isosceles prisms 26 and 28 are arranged as previously mentioned in Fig. 2, but a rhomb 30 has been placed over half of the face of prism 26. Pairs of perpendicular mirrors 20 and 22 comprising plane pieces of metallized glass can be utilized in place of the prisms 26 and 28, as indicated in Fig. 4. It is not necessary to metallize the perpendicular surfaces of the prisms since the light that passes through the hypotenuse 32 of prism 26, for example, strikes each right angle surface 34 and 36 at an angle greater than the critical angle and is totally internally reflected before leaving the hypotenuse or surface of prism 26.

Rhomb 30 can comprise two identical right angle isosceles prisms arranged so that one of the short sides of one of the prisms is placed in contact with and completely overlaps one of the short sides of the other or second prism, the prisms being oriented so that their hypotenuses are mutually parallel or the rhomb 30 can be constructed of a single piece of glass with angles of 45° and 135°, or in place of a rhomb a pair of metallized mirrors 38, shown in Fig. 4, located at 45° to the focal plane of the grating 14 can be utilized, and the entire unit can be arranged as a single assembly. Thus, to recapitulate, a prism-rhomb combination 26—30, as shown in Fig. 3, can be used, or a prism-pair of mirrors combination, 26—38, two pairs of mirrors 20—38, or pair of mirrors-rhomb combination 20—30, or any combination of mirrors and prisms, can be used to receive and displace the radiation from grating 14.

The ray lines are indicated by *g, h, i, j, k,* and *l.* The displaced third spectrum 42 is formed above the first spectrum 16, which is centered on the Rowland circle or focal curve 18 and which passes through the center of the grating 14. The ray *j* enters the exposed face 32 of prism 26. After being reflected from the surfaces 34 and 36 of prism 26, the ray *j* leaves the prism 26 and enters the rhomb 30, and is reflected downwardly by the upper mirror or reflecting surface 44 of rhomb 30 to the lower parallel surface 46 of rhomb 30. The ray *k* leaves the rhomb 30 by its exposed face 48, as indicated in Fig. 3. Since the rays striking the grating 14 come from a lower level than other rays, the diffracted rays will travel upwardly and third or the final spectrum 42 will be formed at a higher position in the focal curve 18. A photocell, exit slit, or the like, could be displaced upwardly in Fig. 3 to receive the final ray *l* from grating 14. In Fig. 7 there is shown an enlarged view of the prism-rhomb combination 26—30.

The various spectra obtained for the aforegoing arrangements will now be described and discussed. Fig. 5*a*, for example, shows a spectrum obtained with the conventional arrangement of Fig. 1, using an iron arc source. The spectrum shows two lines of the 6,000 A.U. region of the iron spectrum at 6,137 A.U. and 6,138 A.U. in the third order marked R. The spectrum also shows the fourth order lines labeled B and the fifth order lines labeled UV which overlap with the third order spectrum. Fig. 5*b*, on the other hand, shows a spectrum obtained with the triple pass arrangement of Fig. 2. It shows the same two red lines of the iron spectrum marked R in the third spectrum of the first order. The dispersion and resolution are substantially the same as Fig. 5*a*. The spectrum also shows lines marked R′ of the first spectrum of the red region of the iron spectrum which overlap the desired third spectrum. Fig. 5*c* shows a spectrum obtained with the triple pass arrangement with offset as shown in Fig. 3. It illustrates the same 6,200 A.U. iron lines designated R at substantially the same dispersion and resolution of Fig. 5*a* but with no overlapping of any kind.

An advantage of using multiple reflections of the spectral lines, as indicated in Figs. 3 and 4, is that "Rowland ghosts" can be canceled. "Rowland ghosts" are false lines which are evenly spaced about the actual lines. They are caused by periodic errors in the screw of the grating engine. These periodic errors produce approximately sinusoidally varying phase error along the diffracted wave. This phase error could be removed if a phase correcting plate were used in the diffracted wave. The sinusoidal phase error along the wave front, if a plane wave is assumed, is repeated with a wavelength equivalent to the pitch of the grating engine screw. It can be shown that the proper phase correcting plate is the grating 14 itself, displaced a distance of one-half the pitch of the screw. By adjusting the displacement of the second reflected beam on the grating 14, the phase errors can be removed and the odd numbered, or even numbered "Rowland ghosts" will not appear. This has been experimentally verified. By use of this technique, the first Rowland ghost has been reduced by a factor of ten (10) in intensity.

It is to be emphasized that ray *j*, for example, could be vertically displaced first by entering the exposed face 48 of rhomb 30, and then be horizontally displaced by the prism 26, before being returned to grating 14, and this prism 26 and rhomb 30 can be reversed. This same condition holds for the arrangement in Fig. 4. In addition, it is to be noted that the position of the entrance slit 12 and the exit slit in Figs. 3 and 4, as well as in other embodiments of the invention using the quadruple mirror system, can also be reversed and the same results will be obtained.

There is an advantage in the use of a field lens near each prism 26 or 28, in Fig. 3, or double mirror combination 20—38. These field lenses can be placed directly in front of the prisms 26—28, or double mirror combinations 20—38, or they can be formed integral with and adjacent to the prism face. For example, the prism face 48 can be a spherical surface. A field lens focuses an image of the grating onto itself and conserves light, gives high resolution over a wide range of wavelengths and results in ghosts being canceled over a wide range of wavelengths, as described above.

The prism 28, shown in Fig. 3, or the mirror 22, shown in Fig. 4, produces a second spectrum at prism 26, or mirror 20, which is adjacent to the slit 12. The position of prism 26 is independent of the position of prism 28 in the spectrum, that is, prism 28 can be placed anywhere in the first spectrum and whatever wavelength of radiation it returns to the grating 14 will fall on prism 26.

Therefore, alternatively, several mirrors 22, 22' or equivalent prisms, can be placed in the first spectrum, as shown in Fig. 4, and these mirrors or prisms will all form overlapping spectra at mirror pair 20 or prism equivalent. However, if a pair of parallel mirrors 38 or a rhomb 30, is introduced at mirror 20, as previously mentioned, the third spectrum will be formed above the first spectrum, and, furthermore, the part of the third spectrum which originated from mirror 22 will appear near the mirror 22 and the parts which originated from other mirrors 22' in the first spectrum will appear above these mirrors 22'. There is no overlapping of spectra if the edges of the mirrors 22 and 22' in the first spectrum are spaced by a distance of at least twice the width of the hypotenuse of the mirrors 22 or 22'. Thus, the distance between the center to center distance of the apexes of the mirrors 22 and 22' must be three times the width of the hypotenuse of the prisms. In order to completely avoid over-lapping, therefore, it will not be possible, in some cases, to obtain third spectra of all of the first spectrum. An exit slit or slits can be placed in these third spectra, and the radiation passing through these slits can be allowed to fall upon sensitive detecting means, such as photocells 54, 54' or the like, which, in turn, can be connected to a recording or indicating means.

Returning to Fig. 2, it should be noted that there are rays of wavelengths other than that which gives rise to ray *b* and which will strike the left side of the mirror 22 instead of the right side as does ray *b*. These rays are displaced outwardly instead of inwardly by the double mirror 22 and these rays are returned to the grating 14 from the right side of the double mirror and consequently form spectra adjacent but to the left of the entrance slit 12. Thus, the band of the spectrum which strikes double mirror 22 will form a second spectrum, centered about the entrance slit. Thus, if a quadruple mirror 20'—38', or prism-rhomb equivalent, is placed on the left side of the entrance slit, as indicated in Fig. 6, and arranged to displace the spectrum upwardly and outwardly instead of inwardly and downwardly, as does the quadruple mirror 20—38, part of the third spectrum will appear below the first spectrum.

It has been previously pointed out that the band of wavelengths striking a reflecting prism 28 or double mirror equivalent 22 in the first spectrum is focused into a second spectrum in the vicinity of the entrance slit 12. This second spectrum is substantially symmetrically distributed about the entrance slit 12 and the quadruple mirror 20—28 can be placed on either side of the entrance slit, or quadruple mirror can be placed on both sides of the entrance slit 12, as shown in Fig. 6. Displacement of the rays from the pair of quadruple mirrors 20—38 or their equivalents can be both upwardly, both downwardly, one combination upwardly, and the other combination downwardly.

With a quadruple mirror arranged on either side of entrance slit 12, as shown in Fig 6, one displacing rays upwardly, such as 20'—38', and with the other quadruple mirror 20—38 displacing the rays downwardly and inwardly, and with a plurality of double mirrors 22, 22', placed in the first spectrum, there will be three lines of spectra appearing in the focal plane or curve 18. At the top and bottom, the third spectrum will appear and in the center will be portions of the first spectrum which are not used to produce these third spectra. In each of these lines of spectra, exit slits can be provided and suitable sensitive detecting means can be placed behind the exit slits, such as photocells 54 and 54''.

One application of this invention is to spectrometers having multiple detectors. These spectrometers are widely used in industry for the rapid quantitative analysis of alloys. An example of such an industrial use is steel analysis. A sample of molten steel is dipped from the furnace and formed into rods which are used as electrodes of an arc or spark discharge. A spectrometric analysis is made of one or more selected spectral lines of each of the elements contained in the steel. In a matter of a few minutes, it is known if the composition of the steel is correct.

The spectrograph used for this purpose may be either prism or grating type. If the grating type of spectrograph is used, it may be plane or concave. A detector, which may be a photocell, photomultiplier tube, photoconductive cell, or any convenient type, is placed in the focal plane for each line whose intensity is desired. An individual exit slit is used to admit just the desired line for each of the detectors. The amounts of light reaching the detectors in a given time are simultaneously recorded. The number of detectors in the focal plane may reach ten or twelve or more for complex analyses, and frequently the desired lines are very close together. This results in excessive crowding of the detectors and frequently auxiliary optical devices are necessary to deflect the light from individual lines to detectors sufficiently separated to avoid their mutual interference because of physical size.

If the focal length of the spectrograph is increased by three times, the linear dispersion in the focal plane is three times larger. There is three times as much room for the detectors since the distance between two wavelengths in the focal plane is three times as great.

It is common practice in industrial spectrographic applications to employ a grating spectrograph which is not multiple passed and which is eleven (11) feet long and five (5) feet wide and which requires the additional mirrors and lenses mentioned previously to separate lines which lie close together so that they may be directed to separate photocells. These additional mirrors and lenses may add several feet to the over-all length of the spectrograph.

It is possible to use a spectrograph less than four (4) feet long and less than two (2) feet wide which by using the optical arrangement shown in Fig. 6, that is, by using two four mirror combinations 20—38, 20′—38′, one on each side of the entrance slit, one displacing the rays upwardly and the other downwardly and a multiplicity of two mirror combinations 22 or right angle isosceles prisms equivalents 28 in the focal plane or curve of the spectrograph. An optical arrangement of this type will give the same dispersion as the larger instrument described in the previous paragraph. The smaller instrument would not require additional mirrors or lenses because the four mirror combinations would separate the close lying lines as previously discussed.

The invention described can be applied to any existing spectrograph to give, for example, a threefold increase in the linear dispersion in the focal plane with no increase in the size of the spectrograph. To recapitulate, this is accomplished by placing the prism-rhomb combination, or its mirror equivalent, on either side of the entrance slit, one with the rhomb shifting the returned light upward and the other shifting the returned light downward. Any place in the normal first spectrum where it is desired to obtain a threefold increase in dispersion, a right angled isosceles prism or its mirror equivalent may be placed to return the light through the dispersing system to the two prism-rhomb combinations. The light returned by these to the dispersing system will yield spectra having three times the resolving power of the first spectrum and situated near the right angle isosceles prism, but above and below the first spectrum. Any number of right angle isosceles prisms may be so placed and in conjunction with the two prism-rhombs they will produce third spectra. Thus, by means of any of the optical arrangements shown in Figs. 3, 4, and 6, it is possible to obtain a high degree of resolution of spectral radiation and to eliminate coincident or overlapping spectra.

As previously pointed out, any spectral line may be singled out by an exit slit and allowed to fall on a suitable detector. These slits and their detectors may be placed in any one of the three levels. For example, suppose that there are two spectral lines which are too close together to permit the two detectors which are necessary to be located side by side. A right angle isosceles prism may be placed in the first spectrum so that one of the lines falls on one-half of the hypotenuse of the prism and the other line on the other half. One of these lines will then appear above the first spectrum and the other line will appear below the first spectrum. They are now well separated with sufficient room for the individual detectors.

Alternatively, two right angle isosceles prisms may be placed with their edges close together, the edges being between the two closely spaced lines which it is desired to separate, the third spectrum of these lines will then appear in two parts, one line above and the other line below the prisms. For any line in the first spectrum where only the usual dispersion is necessary and where there is no physical interference of the detector with detectors for other lines, the detector may be so placed. Thus in practice, a multiple detector spectrograph will have its detectors distributed in three rows instead of a single row.

It has not been mentioned above that in this type of application the part of the first spectrum which is intercepted by the double mirrors in the first spectrum cannot be used as a first spectrum, that is, only parts of the first spectrum are available because part of the first spectrum is returned to the dispersing element. The amount of the first spectrum which is thus removed can be minimized if, for example, the hypotenuses of the prisms in the first spectrum are only as wide as the width in the first spectrum of the spectral regions for which higher numbered spectra are desired. In metallographic analyses problems for which only single spectral lines are desired, the double mirror or prism can be very narrow. However, when narrow prisms or double mirrors are used in the first spectrum, then one edge of the double mirror near the entrance slit in the second spectrum must be very close to the entrance slit.

Figure 5:
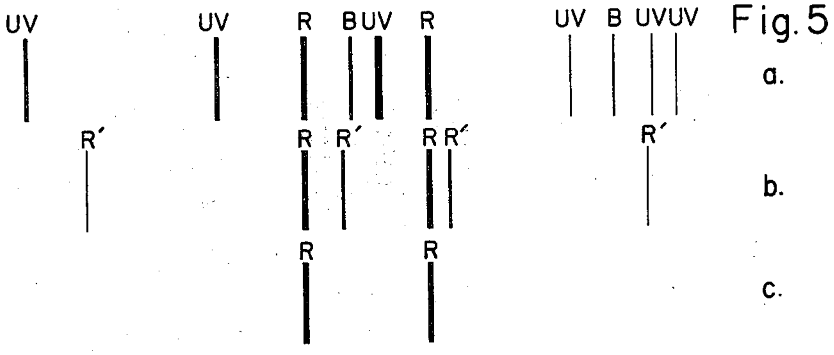

In Figs. 8 and 9 there are illustrated structures for mounting and adjusting a pair of perpendicular mirrors, such as mirrors 20 or 22 illustrated in Figs. 4 and 6, or a pair of parallel mirrors. such as illustrated in Figs. 5 and 6. These structures comprise mounting means 101 and adjusting means 103. Actual adjustment of the mirrors in the desired direction is made by adjusting screw members 106 and 106′ in Fig. 8, or screw members 106″ or 106‴ in Fig. 9. For example, adjustment of screw member 106, will cause the pair of mirrors 20 to move either toward or away from each other due to a spring arrangement 107 or the like. On the other hand, adjustment of screw member 106′ in its threaded housing will cause the pair of mirrors 20 to be moved upwardly or downwardly as desired. The pair of mirrors 38, of Fig. 9, can be moved toward or away from each other by adjusting screw member 106″, while both mirrors can be moved upwardly or downwardly as a unit by adjusting screw member 106‴. Thus, by means of the mechanical arrangements illustrated in Figs. 8 and 9, it is possible to rapidly adjust the mirror arrangements previously referred to.

Another important application of multiple diffraction is to the Ebert grating monochromator, which is described in detail in the copending application Serial Number 241,194, by William G. Fastie. This monochromator as shown in Fig. 10, in essence, comprises a curved entrance slit 60, a concave mirror 166, for reflecting the radiant energy from entrance slit 60 and rendering the rays thereof parallel, a dispersing element 14′ for forming a spectrum and for returning the radiant energy to the mirror 166 so that it can be reflected a second time and then be sent to a curved exit slit 62.

By using the features of the invention with the Ebert grating monochromator, it is possible to employ multiple diffraction and prevent error due to curvature of spectral lines. In addition, the double mirror arrangement can be used at a skewed angle to slightly displace each spectrum so that the final spectrum is displaced and does not overlap any other spectrum. The use of a vertically displacing rhomb or pair of parallel mirrors in the $(r-1)$th spectrum prevents the $r$th spectrum from overlapping the lowered number spectra. The various optical arrangements for accomplishing the above and other features of the invention will be described.

In general, in any spectrograph, if a long straight entrance slit is used, the spectral lines which lie in the plane of the spectrum will be found to be curved. Thus, if straight slits are used in a monochromator, it will be found that the light coming through the exit slit is not monochromatic, but that slightly different wavelengths come through different parts of the slit. If the quantity of light leaving the exit slit is not of great importance, a short slit tangent to the curved lines may be used to minimize the error. But if it is desired to use long slits, the exit slit, or the entrance slit, or both slits may be curved in order to cancel this wavelength error.

The nature and degree of curvature of the slits necessary to make this cancellation exact depends upon the design of the spectrograph and the dispersing element, and generally upon the wavelength of radiation passing through the monochromator. For example, the required curvature would be different if a grating were used rather than a prism. The amount of curvature required is changed if multiple use is made of the dispersing element.

It has recently been shown as described hereinbefore that in a plane grating spectrograph if both the entrance and exit slits 60 and 62, respectively, as shown in Fig. 10 are curved about a proper center, variation of wavelength along the slit is not observed. In particular, the system shown in Fig. 10 in which the entrance and exit slits 60 and 62 are circular with their centers of curvature on the line 64 does not exhibit any wavelength variation along the exit slit 62 even if the slits were made extended to include a whole semicircle. It can be seen from the symmetry of this system that entrance and exit slits 60 and 62 are interchangeable, and that if a concave mirror 66 were placed behind the exit slit 62 the image of the spectrum would be reversed in curvature, which would produce wavelength error at the exit slit in the second spectrum.

That is, if an exit slit 62 were placed in the second spectrum, which appears near the entrance slit 60, as shown in Figs. 11 and 12, the second spectrum would be curved in the opposite direction to the curvature of the entrance slit and the curvature would no longer be accurately circular and the required curvature would vary with the wavelength of the radiation. Thus the above described application of multiple diffractions to grating monochromators is limited to the use of very short slits or suffers from reduced spectral resolving power.

An alternative system to allow multiple use of the dispersing element 14' when long slits are desired is shown in Fig. 13. A multiplicity of small mirrors 68, 68', 68'', are employed to produce a second spectrum adjacent to the entrance slit 70. The mirrors 68, 68', 68'', are positioned so that their lines of intersection are in the focal plane of the spectrometer and are tangent to a circle whose center is at the point 72. Although each of these individual pairs of mirrors 68, 68', 68'', produce a reversed curvature in the second spectrum as indicated in Fig. 13 by the images 74, 74', 74'', the error introduced by such short slit elements can be made negligibly small by employing a sufficient number of small mirror pairs 68, 68', 68'', in the first spectrum. The several images 74, 74', and 74'' of the short mirrors will fall along a circle whose center is close to the point 72 and whose wavelength error along the exit slit 76 will be very small.

It is to be noted that the radiant energy from the entrance slit 70 is collimated and reflected from a first surface area 77 of a mirror 78 to the spectral dispersing element 14', which is a plane grating having suitable means for rotating it. The radiant energy is then redirected to a second reflecting surface area 79 of mirror 78. The second surface area redirects the radiant energy to the plurality of small double mirrors as indicated above. Mirror 78 is, of concave spherical shape, and it can be either a single mirror or two separate mirrors of spherical shape or two off-axis parabolic mirrors. The ray lines for double mirror 68'' of this system are indicated by *a'*, *b'*, *c'*, *d'*, *e'*, *f'*, *g'*, and *h'*, to form the final image 74''. The mirror 78 and the dispersing element 14' utilized in Fig. 13 will be the same for the other optical system now to be described.

An alternative system to allow multiple use of the dispersing element 14' when long slits are desired and which avoids the multiplicity of double mirrors is shown in Fig. 14. A single mirror 80 is placed in the first spectrum and ahead of the focal plane. The spectrum is brought to focus near the center line 82 of the spectrometer and then falls on the mirror 84 which directs the radiation through the spectrograph again to form a second spectrum which is not intercepted by the mirror 80, and may fall on the exit slit 86. Alternatively, the second spectrum may also be intercepted by the mirror 80, proceed to the mirror 84 and pass through the spectrometer again to form a third spectrum at the exit slit 86 and so on.

In all such cases, the curvature of the spectrum is always substantially correct because, although the double mirror 80—84 reverses the curvature of the spectrum as explained above, for the double mirror 66 of Figs. 11 and 12 it also reverses the image of the spectrum to the opposite side of the grating in which position the reversed curvature is desired.

This principle can best be illustrated by considering a spectrum consisting of a single monochromatic radiation, and by recalling that the slits of this type of spectrograph must be on a circle whose center is at point 83. Referring to Fig. 14, the single spectrum line would form an image near the exit slit 86 if it were not intercepted by the mirror 84 which sends it through the spectrograph again. The radiation appears to have originated from a point in the plane and near to the entrance slit 88. Moreover, the double reflection has reversed the curvature so that the spectrum line appears to have the same curvature as the entrance slit 88. This virtual image of the first spectrum can be considered to be the entrance slit 88 for the second spectrum, and it, therefore, very nearly fulfills the condition that its center of curvature is at the point 83. In like manner, three, four, and five passages through the optical system result in formation of virtual slit images which can very nearly satisfy the exact condition of curvature required, which curvature is independent of wavelength and the number of uses which are made of the dispersing element 14'. The ray lines of this system are indicated by *a''*, *b''*, *c''*, *d''*, *e''*, *f''*, *g''*, *h''*, and *i''*, to form the final image at 86.

When more than two uses are made of the dispersing element 14', the spectra of a given color or wavelength which are formed near the center line 82 lie adjacent to each other and are separated from each other along the line 82. Of course, there are other wavelengths in the various spectra which overlap and interfere with the spectrum line or color which is desired at the exit slit 86, as explained for other types of spectrographs employing multiple uses of the dispersing element.

However, this overlapping can be avoided by the use of double parallel mirrors or a rhomb placed in the $(r-1)$th spectrum near the center line 82 or a second pair of mirrors can be provided for preventing overlapping and which introduces negligible wavelength error along the exit slit 86 as will now be described. As previously pointed out in this embodiment of the invention, the entrance and exit slits 88 and 86, respectively, are positioned on their own circle.

Referring now to Fig. 15, the first mirror 80 of the pair of mirrors is positioned below the level of the exit slit 86 and is external to a cylinder whose axis is parallel to the center line of the system and passing through the entrance and exit slits 88 and 86, respectively, and the second mirror 84 being positioned near the entrance slit 88 and inside of the geometrical cylinder containing the slits 86 and 88. The additional mirrors 87 and 89 are arranged parallel to each other and positioned to intercept the radiation in the $(r-1)$th spectrum near the center line 82 and to virtually displace the radiation in that spectrum and send it to the mirror 90. The mirror 90 is positioned below the level of the entrance slit 88 and is intercepted by the geometrical cylinder. The $(r-1)$th spectrum thus is displaced in a downwardly direction to the mirror 90 which directs the radiation to the area 77 of mirror 78 and there is produced a virtual image of the $(r-1)$th spectrum in the plane of the entrance slit 88 but below it and curved in the proper manner, that is, a single spectrum line will form a virtual image in the plane of the entrance slit 88 with a curvature whose center line is near the center line 82.

The *r*th spectrum which is formed by this displaced virtual image is displaced above the original position of the *r*th spectrum, and the exit slit 86 is placed as shown in Fig. 15, with its center of curvature on the center line 82. In this way, overlapping spectra can be avoided and only a small error due to curvature of spectrum will exist.

Still another and preferred means to produce multiple spectra without overlapping and without introducing even small errors due to curvature of the spectra is illustrated in Figs. 16 and 17. Radiation from an entrance slit 92 passes through the spectrometer and strikes the mirror 94, which is slightly skewed to send the radiation to the mirror 96, which is below the entrance slit 92, and through the spectrometer again to form a spectrum on the exit slit 98, which is above the mirror 94. The ray lines for this system are indicated by numerals 1, 2, 3, 4, 5, 6, 7, 8, and 9. The entrance slit 92, the exit slit 98 and the virtual image 100 of the entrance slit in the first spectrum are along a circle whose center is at 102.

This can be accomplished for the virtual image of the first spectrum by proper adjustment of the mirrors 94 and 96. This system is distinguished from the previously described systems in that the virtual image of the first spectrum is exactly on the proper circle rather than nearly on the circle, and therefore the correcting effects which can be obtained by use of circular entrance and exit slits can be completely realized in this system. Since the second spectrum is displaced above the first spectrum, there is no overlapping of the spectra.

This system can be extended to more than two diffractions. For example, Fig. 16 shows how two additional mirrors 104 and 106 can be used to produce a third spectrum which is displaced from the other spectra and in which both slits and the virtual images of the first and second spectrum are all exactly along a circle whose center is at 102. The ray lines for this system are indicated by 1, 2, 3, 4, 5, 6, 7, 8, 9, 10, 11, 12, 13, and 14.

All of the above described systems can incorporate a light chopper, in particular, a light chopper in the $(r-1)$th spectrum to avoid scattered light and all other desired functions can be incorporated, such as mechanical means for rotating the grating and the like.

Obviously many modifications and variations of the present invention are possible in the light of the above teachings. It is therefore to be understood that within the scope of the appended claims the invention may be practiced otherwise than as specifically described.

What is claimed is:

1. An improved optical system for a spectrograph, comprising, a dispersing element, means for directing radiant energy to said dispersing element and for focusing the spectrum of said dispersing element, and four reflecting surfaces, two of said reflecting surfaces being perpendicular to each other and the other two said reflecting surfaces being parallel to and facing each other to provide both horizontal and vertical displacement, respectively, of the radiant energy from said dispersing element and to return said radiant energy to the same area of said dispersing element to form another spectrum which is displaced from other spectra and focused in substantially the same focal curve containing said first spectrum.

2. An optical system for a spectrograph, comprising, a dispersing element, means for directing radiant energy to said dispersing element and for focusing a first spectrum of said dispersing element, a plurality of means located near said first spectrum for horizontally displacing a plurality of portions of said radiant energy received by each of said plurality of means and for returning the portions of radiant energy to said dispersing element to form second spectra of each portion of radiant energy, and means mounted in the second spectra of the radiant energy for horizontally and vertically displacing and for returning the radiant energy to said dispersing element to produce a plurality of portions of a third spectrum vertically displaced from the first spectrum.

3. An improved optical system for a spectrograph, comprising, a dispersing element, means for directing radiant energy to said dispersing element and for focusing the spectrum of said dispersing element, a first means positioned near the focal plane of said spectrograph for intercepting the radiant energy of the first spectrum formed by said dispersing element and horizontally displacing and returning said radiant energy to said dispersing element to form a second spectrum, a second means positioned near said focal plane for intercepting said radiant energy of said second spectrum formed by said dispersing element and horizontally displacing and returning said spectral radiation to said dispersing element to form a third spectrum, and means interposed between said second means and said dispersing element for vertically displacing the radiant energy from said second means before the radiant energy is dispersed a third time by said dispersing element, whereby said third spectrum is displaced above or below said first spectrum and will not, therefore, be overlapped or interfered with by said first spectrum.

4. An optical system for a spectrograph, comprising, means including a dispersing element for producing an image in space of a spectrum, means for returning from said spectrum radiant energy to the same area of said dispersing element to form images in space of a further spectrum in substantially the same focal curve containing said first mentioned spectrum, said energy returning means including optical structure for vertically displacing one spectrum relative to another.

5. An optical system for a spectrograph, comprising, means including a dispersing element for producing images in space of a spectrum, means for returning from said spectrum radiant energy to the same area of said dispersing element to form images in space of a further spectrum, and means for returning radiant energy to said dispersing element from said further spectrum, at least one of said energy-returning means including optical structure for vertically displacing one spectrum relative to another.

6. An optical system for a spectrograph, comprising, means including a dispersing element for producing images in space of the spectrum, means for returning from said spectrum radiant energy to the same area of said dispersing element to form images in space of a further spectrum in substantially the same focal curve containing said first mentioned spectrum, said energy-returning means including optical structure for inverting the spectrum returned to said dispersing element and including optical structure for vertically displacing one spectrum relative to another.

7. An optical system for a spectrograph, comprising, means including a dispersing element for producing an image in space of a spectrum, means located near said image for inverting said spectrum and for returning radiant energy in said spectrum to the same area of said dispersing element to form an image in space of a second spectrum, a plurality of inverting means, one of which is positioned near the image of said second spectrum to return radiant energy from said second spectrum to the same area of said dispersing element to form an image of a third spectrum, another of said plurality of inverting means being positioned near the image of said third spectrum to return radiant energy in said third spectrum to the same area of said dispersing element and so forth until the image of an $r$th spectrum is formed, and a means associated with any one of said inverting means to provide vertical displacement of the radiant energy so that the image in space of the final or $r$th spectrum is not coincident with and does not overlap other spectra which said dispersing element produces.

8. An improved optical system for a spectrograph, comprising, means including a spectral dispersing element for obtaining high numbered spectra, and an optical means for displacing radiant energy from said dispersing element from at least one of said spectra in a direction such that the final spectrum is displaced from all other spectra in a direction along the lines of such other spectra and in substantially the same focal curve containing the first spectrum.

9. An optical system for a spectrograph, comprising, optical means including a dispersing element for spreading radiant energy into one spectrum and for then spreading radiant energy from the first spectrum into a second spectrum focused in substantially the same focal curve containing said first mentioned spectrum, and optical means disposed in the path of said radiant energy for displacing the same laterally of one of said spectra, thereby to produce a final spectrum laterally displaced from the other spectrum.

10. In an optical system including parallelizing means, a dispersing element disposed for directing radiant energy to said parallelizing means, structure defining a first arcuate aperture for directing radiant energy from a source to said dispersing element, a plurality of pairs of small perpendicular mirrors positioned so that their lines of intersection are in the focal plane of said optical system and are tangent to a circle along which there is no variation in wavelength, and structure defining a second arcuate aperture having the same curvature as said first arcuate aperture, said second arcuate aperture being placed in the second spectrum and so positioned that there is no variation in wavelength along said second arcuate aperture.

11. An optical system for a spectrograph, comprising, an entrance slit, a dispersing element, means for directing radiant energy to said dispersing element and for focusing a first spectrum of said dispersing element, a plurality of means located near said first spectrum for horizontally displacing the portions of radiant energy received by each of said plurality of means and for returning the portions to said dispersing element to form second spectra of the portions of radiant energy, and a pair of means for horizontally and vertically displacing the portions of received radiant energy and for returning the radiant energy portions to said dispersing element to form a plurality of third spectra, each of said pair of horizontal and vertical displacing means being located on opposite sides of said entrance slit, one of said horizontal and vertical displacing means being arranged to displace the received radiant energy portions upwardly and the other horizontal and vertical displacing means being arranged to displace the received radiant energy portions downwardly to said dispersing element whereby double plurality of portions of a third spectrum will be produced, one half of the portions of the third spectrum being displaced vertically above and the other half of the portions of the third spectrum being displaced vertically below said first spectrum.

12. A monochromator optical system, comprising, an entrance slit, an exit slit, a plane grating for dispersing radiant energy, means for parallelizing the radiant energy incident on said grating and for focusing the radiant energy diffracted by said grating, and $(r-1)$ pairs of plane mirrors positioned to produce a $r$th spectrum on said exit slit separated from lower numbered spectra, the geometrical arrangement of the various elements being such that said slits are positioned on a circle and curved so that their centers of curvature are at the center of said circle, a line perpendicular to said circle and passing through the center of said circle and being parallel to the bisector of all incident and diffracted radiant energy rays, said grating being contained within a geometrical cylinder whose center is coincident with said line and whose diameter is no larger than the diameter of said circle, said pairs of mirrors being positioned at an angle of substantially 45° to said line in such a way that the virtual images of the first to $(r-1)$th spectra of the $r$th spectrum lie on said circle.

13. In an optical system including parallelizing means, a dispersing element disposed for directing dispersed radiant energy to said parallelizing means, structure defining an arcuate aperture for directing radiant energy from a source to said dispersing element, and means including a double mirror arrangement mounted ahead of the focal plane of said optical system and arranged at a skewed angle to the longitudinal axis of said system to slightly displace each spectrum so that the final spectrum is displaced and does not overlap any other spectra.

14. A plane grating spectrometer, comprising, arcuate entrance and exit slits, and optical means to intercept radiant energy in the first spectrum, invert said spectrum and transpose said radiant energy so that a real or virtual image of a narrow wavelength region of said first spectrum is formed on a circle whose center substantially coincides with the center of curvature of the edges of said entrance slit, said exit slit being positioned in the second spectrum in such orientation that said edges of said exit slit follow the line of invariant wavelength.

15. A monochromator optical system, comprising, an arcuate entrance slit, an arcuate exit slit, a plane grating for dispersing radiant energy, a focusing and parallelizing means including a concave mirror and at least a first pair of plane mirrors; the geometrical arrangement of the aforegoing elements being such that said slits lie in a plane and are positioned on a circle so that their centers of curvature are at the center of said circle, a line perpendicular to the plane of said circle, and passing through the center of said circle and containing the center of curvature of said concave mirror; said plane grating being contained within a geometrical right circular cylinder whose axis is coincident with said line and whose diameter is the same as the diameter of said circle; and said pair of plane mirrors being positioned between said circle and said concave mirror, the first mirror of said first pair of mirrors being positioned so as to intercept the first spectrum and direct the light which would come to a focus on said circle to the second mirror of the first pair of mirrors which is positioned to return the light to said concave mirror as though it had come from a virtual source lying on said circle in a position near to but not coinciding with said entrance slit so as to form a second spectrum falling on said circle in a position near to but not coinciding with the position which would be occupied by said first spectrum in the absence of the first pair of mirrors; a second pair of mirrors, said second pair of mirrors being positioned so that the first mirror of said second pair of mirrors intercepts said second spectrum and directs the light to the second mirror of said second pair of mirrors which is positioned to return the light to said concave mirror as though it had come from a virtual source lying on said circle from a position near to but not coinciding with said entrance slit so as to form a third spectrum falling on said circle in a position near to but not coinciding with the positions which would be occupied by said first and second spectra in the absence of said first and second pairs of mirrors, respectively, and succeeding pairs of mirrors being positioned similarly to provide an $r$th spectrum with $r$ times the dispersion of said first spectrum and which is not overlapped by any other spectra.

16. An optical system for a spectrograph, comprising, a dispersing element, means for directing radiant energy to said dispersing element, means for focusing the spectrally dispersed energy from said dispersing element onto a focal curve, and means to provide both horizontal and vertical displacement of the radiant energy reaching said focal curve from said dispersing element and to return said radiant energy to said dispersing element to form another spectrum in said focal curve but displaced above or below said first spectrum.

17. An optical system for a spectrograph, comprising, a dispersing element, means for directing radiant energy to said dispersing element and for focusing a first spectrum of said dispersing element, means located near said first focused spectrum for horizontally displacing a portion of said radiant energy received by said horizontally displacing means and for returning said portion of radiant energy to said dispersing element to form a second spectrum of said portion of radiant energy, and means mounted near the second focused spectrum for horizontally and vertically displacing and for returning at least part of the radiant energy in said second spectrum to said dispersing element to produce a portion of a third spectrum vertically displaced from said first spectrum.

18. An optical system for a spectrograph, comprising, a dispersing element, means for directing radiant energy to said dispersing element and for focusing the spectrum from said dispersing element, and means for providing both horizontal and vertical displacement of the radiant energy from said dispersing element and for returning said radiant energy to the same area of said dispersing element to form another spectrum which is displaced from all other spectra and in substantially the same focal curve containing said first spectrum.

References Cited in the file of this patent

UNITED STATES PATENTS

| | | |
|---|---|---|
| 1,727,173 | Muller | Sept. 3, 1929 |
| 2,314,800 | Pineo | Mar. 23, 1943 |
| 2,453,164 | Swings | Nov. 9, 1948 |
| 2,594,334 | Miller | Apr. 29, 1952 |
| 2,638,811 | Williams | May 19, 1953 |
| 2,652,742 | Walsh | Sept. 22, 1953 |
| 2,749,793 | White | June 12, 1956 |

OTHER REFERENCES

"Ein Spectroskop mit grosser Dispersion", A. Cornu, pages 171, 172 in Zeischrift fur Instrumentenkunde, volume 3, May 1883.

"Spectroscopy", E. C. C. Baly, vol. 1, 3rd edition, published in 1924 by Longmans, Green & Co., New York city, pages 52, 53.

"Improving the Performance of a Littrow-type Infra-Red Spectrometer", Rochester et al., pages 785–786 in Nature, vol. 168, No. 42,979, November 3, 1951.

Journal of the Optical Society of America, vol. 42, issue No. 4, pages 282–283, April 1952, vol. 42, issue No. 10, pp. 699–705, October 1952.